Feb. 3, 1970 F. S. CILINO ET AL 3,493,730

DATA INPUT CARD

Filed Sept. 14, 1966

INVENTORS F. S. CILINO
J. E. GORMAN
G. D. GREEN
R. TEVONIAN

BY MARN & JANGARATHIS

ATTORNEY

United States Patent Office 3,493,730

Patented Feb. 3, 1970

3,493,730

DATA INPUT CARD

Frank S. Cilino, Hamilton Township, Mercer County, James E. Gorman, West Amwell Township, Hunterdon County, Geoffrey D. Green, Penns Neck, West Windsor Township, Mercer County, and Ronald Tevonian, Montgomery Township, Somerset County, N.J., assignors to Western Electric Company, Incorporated, New York, N.Y., a corporation of New York Filed Sept. 14, 1966, Ser. No. 579,382
Int. Cl. G06k 21/00, 7/00
U.S. Cl. 235—61.12 3 Claims

ABSTRACT OF THE DISCLOSURE

A data input card including an irregularly shaped edge formed substantially in the shape of a V, which is engageable sequentially with a plurality of sensing elements and operable to move the sensing elements sequentially from a rest position into a sensing position. The card may also be provided with "nonsense" holes for moving the sensing elements out of an unpreferred position, caused by insertion of the card into card reading apparatus, and into a preferred position preparatory to the sensing elements reading of the first line of information bearing holes contained in the card. This invention relates to a new and improved data input card which is simple and inexpensive to manufacture, and more particularly, to a new and improved data input card which, as compared with certain prior art data input cards, is more flexible and is more easily and readily insertable into the apparatus for reading or sensing the card. Further, as compared with such prior art data input cards, this invention also relates to a new and improved data input card which causes less wear on the apparatus for sensing the card. Additionally, this invention relates to a data input card which is provided with non-information bearing holes for assuring the proper orientation of the means for sensing information bearing holes to be formed in the card.

Figure 1:
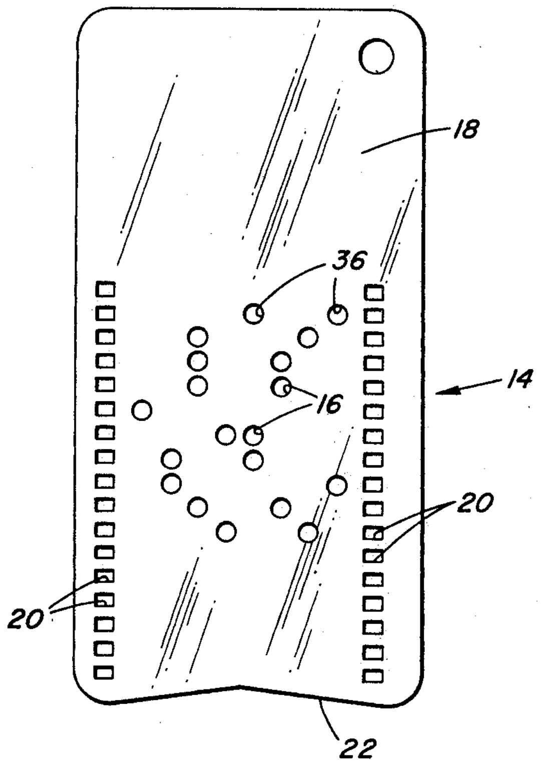

In the past, various prior art data input cards have been used to store information in the form of coded holes provided in the card; for example, the input data cards disclosed in U.S. Patent No. 3,114,036, issued Dec. 10, 1963, to Bell Telephone Laboratories, Incorporated, as assignee of Ernest R. Andregg. Although not limited thereto, such input data cards, and the input data card of the present invention, are particularly suited for storing telephone numbers in the form of coded holes provided in the card, and such cards, although not limited thereto, are also particularly suited for use with automatic telephone call transmitters of the type disclosed in the pending application of Ernest R. Andregg-William Pherd-Rembert R. Stokes, Ser. No. 844,054, filed Oct 2, 1959, now Patent No. 3,124,659, issued Mar. 10, 1964.

Typically, such prior art data input cards are provided with a row of sprocket feed holes along each edge of the card, and upon manual insertion of the card into the card reading or sensing apparatus, spring or motor driven sprockets engage the sprocket feed holes to advance the card past sensing springs or sensing elements which read or sense the coded holes provided in the card.

While from the standpoint of various major and important considerations, such prior art data input cards are of extremely high quality, great utility, and provide wide flexibility of use, it has been found that, comparatively, the data input card of the present invention is more simple and less expensive to manufacture, is more easily insertable into the apparatus for sensing the card, causes less wear on the apparatus for sensing the card, and is more tamperproof.

Certain prior art data input cards are provided with a straight edge, which edge, upon insertion of the card into the card reading apparatus, is engageable, simultaneously, with all the sensing springs or sensing elements for reading or sensing the coded holes provided in the card, and is operable to move all the sensing springs or sensing elements, simultaneously, from their rest positions to their reading or sensing positions. The cumulative force required to accomplish such simultaneous sensing spring movement can be substantial, even to the point of becoming objectionable to the card user. Further, the cumulative resistance of the sensing springs or sensing elements to such simultaneous movement can be so great as to cause card skewing, and the card skewing can be so great as to cause card jamming, which is always highly objectionable and undesirable.

In an effort to overcome such objectionable and undesirable occurrences, certain prior art data input cards have been provided with a chamfered or beveled edge for engaging and moving the card sensing springs or sensing elements from their rest positions into their sensing positions. However, the provision of the chamfered or beveled edge has required that the card be molded and the molding operation increases the cost of the card considerably beyond the cost required to produce a comparable card from strips of sheet stock by a simple punching or stamping operation.

Further, the manner in which certain prior art data input cards provide for the coding of the information into the card has also contributed to the necessity for molding the card, and has required that the card be made of a relatively hard, brittle plastic material which contributes materially to the shortening of the life of the card sensing springs or sensing elements. For example, the data input cards of the above-identified Andregg patent are provided with an array of removable portions referred to as "knock-outs," which knock-outs are either a thin sheet of readily punctured plastic overlying an array of holes formed in a sheet of heavier plastic, or a plurality of individual disks, each disk residing within a hole and being integrally joined to the card by gates. To code such data input cards, in the first instance, the knock-outs are punctured by a pencil or similar instrument, and in the second instance, the gates are sheared by pressing against the disks also with a pencil or similar instrument.

Thus, particularly in the second instance where the knock-outs must readily snap out of the card, such cards must be made of a relatively hard, brittle material, for example, and as has been used in actual practice, a plastic referred to in the art generally as an ABS (acrylonitrite butadiene styrene) plastic, such as for example, Cycolac, a product of Union Carbine Corp. Such material, with regard to other known plastics generally, is hard, brittle and comparatively abrasive, and since the sensing springs which sense the holes in the cards must pass repetitively over the surface of the card, such material contributes materially to the shortening of the life of the card sensing springs.

Additionally, the quality of such ABS plastic materials, i.e., the hardness, brittleness, etc., does not permit the data input cards made therefrom to be produced by a simple and inexpensive stamping or punching operation, but rather requires that the cards be produced by the more expensive and complex molding operation. It has been found that data input cards produced from, for example, polypropylene, rubber modified styrene, or vinyl, as compared with cards produced from the ABS plastics, are relatively flexible, less brittle and abrasive, and smooth, and are readily susceptible to being punched or stamped from strip stock.

Further, while the prior art data input cards comprised of the disk knock-outs provide great user convenience by permitting on-site card coding by subscribers, such convenience also gives rise to various problems. For example, it makes tampering with the card relatively easy, and in heavy commercial or industrial use, it makes for easy, unintentional changing of the card coding. Where such a card is used to input ordering data concerning expensive materials and supplies, such tampering or unintentional card code changing can be a significant and highly objectionable problem.

Also, since a major portion of such a card (generally said to be prescored) is comprised of gate supported disk knock-outs, the card structurally is considerably weakened. To compensate for such structural weakness, and yet provide a card suitably small and convenient for subscriber use, it has been found to be necessary to make the knock-outs as small in diameter as possible, and thereby leave a maximum of unscored material between the knock-outs. Such small diameter holes reduce the amount of dwell time of the sensing springs or sensing elements which read or sense the holes, and in order to provide adequate dwell time, it has been found to be necessary to bevel the sides of the card material defining the holes. The provision of such beveled surfaces, as in the instance of the above-mentioned beveled card edge, has also necessitated the use of expensive card molding production techniques. Furthermore, a line of prescored knock-outs presents a rasp-like surface of hard, comparatively abrasive material, over which the sensing spring must pass with each use of the card. This also materially decreases the life of the sensing springs or sensing elements.

Accordingly, it is the primary object of the present invention to provide a new and improved data input card which is simple and inexpensive to manufacture .

Another object of the present invention is to provide a new and improved data input card which can be punched or stamped from sheet or strip stock of plastic material.

Another object of the present invention is to provide a new and improved data input card which, as compared with certain prior art data input cards is more easily insertable into the apparatus for reading the card.

Another object of the present invention is to provide a new and improved data input card which, as compared with certain prior art data input cards, causes less wear on the sensing springs or sensing elements which read or sense the card.

Another object of the present invention is to provide a new and improved data input card which, as compared with certain prior art data input cards, is comparatively tamper-proof and not readily susceptible to unintentional code changing.

Another object of the present invention is to provide a data input card which has all perpendicular edges, i.e., no beveled edges, and which thereby can be stamped or punched from sheet or strip stock, and yet which perpendicular-edged card is easily insertable into the apparatus for reading the card against the action of the card sensing springs.

Finally, it is most important that the sensing springs for reading the card be properly oriented with respect to the information bearing holes formed in the card, particularly if the sensing springs have become worn or dirty. In the case of a perfectly smooth card including only the holes required, the desired sensing spring orientation may not take place until after the first character is read, thereby causing the first character to be lost.

Accordingly, a still further object of the present invention is to provide a data input card which is provided with non-information of non-intelligence bearing holes for assuring proper orientation of the means for sensing the information or intelligence bearing holes.

A feature of the present invention is a data input card which is a relatively stiff, generally rectangularly-shaped, planar structure, the edge or edges of which are perpendicular with the front and back surfaces of the card.

Another feature of the present invention is a data input card which is provided with an irregularly-shaped edge, which edge is perpendicular with the front and back surfaces of the card, and which edge, upon the insertion of the card into the apparatus for reading the card, is engageable sequentially with the sensing springs for sensing the card, and is operable to move the sensing springs, sequentially (not simultaneously), from their rest positions into their spring positions.

Another feature of the present invention is a data input card which is provided with a plurality of non-informational, non-intelligence bearing holes which assure the proper orientation of the sensing springs or sensing elements with respect to the sensing of the informational or intelligence bearing holes provided in the card.

Figure 4:
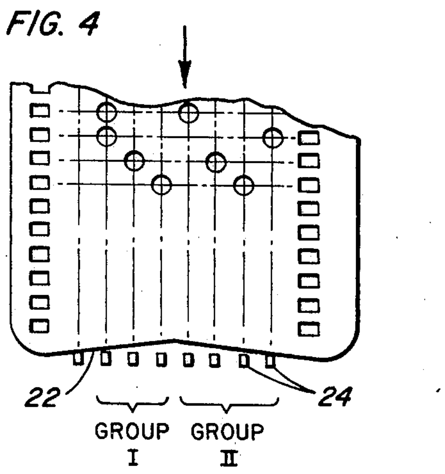
Figure 3:
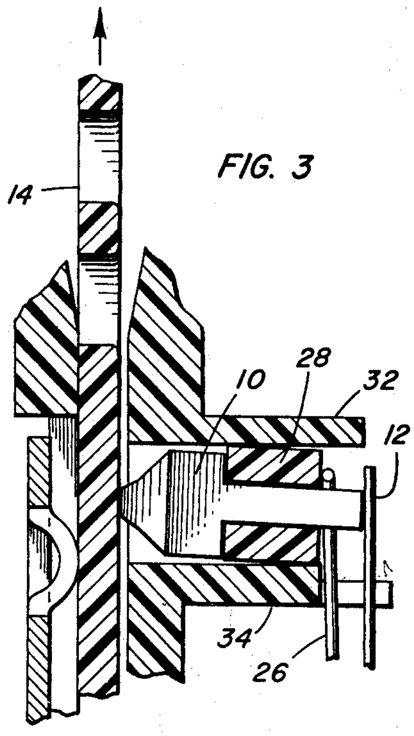
Figure 2:
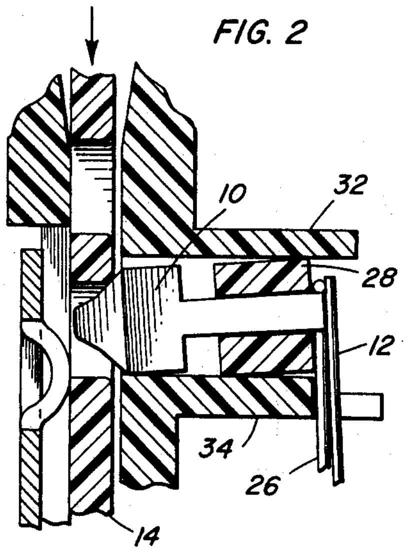

An even more complete understanding of the present invention may be obtained from the following detailed description when read in conjunction with the attached drawings, wherein:

FIG. 1 is a plan view of the data input card of the present invention,

FIGS. 2 and 3 are diagrammatic representations showing the manner in which the sensing springs or sensing elements read or sense the data input card, and FIG. 4 is a diagrammatic representation illustrating the manner in which the data input card of the present invention is operable to move the card sensing springs or sensing elements sequentially from their rest position into their sensing position.

It will be understood by those skilled in the art, that the expressions "sensing springs" and "sensing elements" are used in a general sense to connote or include any instrumentality or combination of instrumentalities for reading or sensing a data input card, and further that such expressions in the specific context of the present specification, connote the sensing member 10 and associated biasing spring 12 shown in FIGS. 2 and 3; the sensing member 10 and bias spring 12 being representative of a plurality of such members and springs.

Referring now to the drawings, and in particular FIG. 1, there is shown a data input card 14 which may be utilized to store or record telephone numbers in the form of holes 16 provided in the card. The holes may be arranged in discrete groupings, as indicated by the Group I and Group II designations, and in the manner disclosed in the above-identified Andregg et al. patent, or the holes may be arranged or grouped in other coded arrangements known to the art. Further, it will be appreciated by those skilled in the art, that while the present invention is disclosed in the context of a data input card for storing or recording telephone numbers, the present invention is equally applicable to other input data cards where the information or data is stored or recorded in the form of holes provided in the card.

The card, as shown in FIG. 1, is a generally rectangularly shaped, planar structure, which is provided at the upper portion of the top surface with a smooth field portion 18 on which, for user convenience, may be placed in written form the information stored in the lower portion of the card in the form of coded holes, such as the coded holes 16 which are information or intelligence bearing holes.

A row of feed holes, or sprocket holes, 20 is provided on each side of the card. To insure proper orientation with a data input card with respect to the apparatus for reading the card, the rows of feed holes are located asymmetrically with respect to the card. Thus, the feed holes polarize the card so that it can be inserted into the apparatus for reading the card in the correct position only, thereby insuring the proper reading of the information stored in the card.

The bottom edge 22 of the card is irregularly shaped, such as being provided with a V-notch as shown; such configuration being referred to as "fish tail" shaped. The irregularly shaped edge 22 is also perpendicular to the front and back surfaces of the card 14.

The purpose of the new and unique V-notch, or "fishtail" card edge 22, is to cause the card, upon insertion into the card reading apparatus, to engage the card sensing springs or sensing elements sequentially, (such sensing springs of elements being indicated diagrammatically by the numerical designation 24 in FIG. 4) and move the card sensing springs or elements sequentially from their rest position into their sensing position.

More specifically, the purpose of the V-notch is to cause the card, upon insertion into the card reading apparatus, to move the plurality of sensing members 10 sequentially from their leftward or rest positions shown in FIG. 2, against the action of their associated bias springs 12, into their rightward or sensing positions shown in FIG. 3; it being understood by those skilled in the art, that the sensing members 10 are normally biased for leftward movement by their associated bias springs 12, such that upon the presentation of a hole to a sensing member, the sensing member will sense or read the hole, i.e., determine the presence thereof, by being moved by the associated bias spring 12 from its sensing position (FIG. 3) into its rest position (FIG. 2), such that the bias spring 12 makes physical and electrical contact with the contact spring 26.

As illustrated diagrammatically in FIG. 4, upon downward movement of the card 14 against the action of the sensing springs or elements 24 (more specifically the action of the bias springs 12), the V-notch, or "fishtail" edge 22 will first engage the outer sensing springs or elements and move the outer sensing springs or elements from their rest positions into their sensing positions, and then subsequently, upon continued downward movement of the card, will engage the center sensing springs or elements and move the center sensing springs or elements from their rest positions into their sensing positions.

Thus, it will be appreciated, that even though the V-notched, bottom card edge 22 is perpendicular to the front and back card surfaces, i.e., is not beveled, that as a result of such sequential engagement of the sensing springs or elements by the card edge 22, the total spring action of all the sensing springs or elements is not brought to bear, simultaneously, against the card to resist the entry of the card into the card reading apparatus. Instead, at any one time, only the resisting spring action of a portion of the sensing elements is brought to bear against the card. Accordingly, comparatively less force is required to insert the card into the card reading apparatus which reduces and substantially eliminates the tendency toward card skewing, and therefore, there is less tendency for the card to jam during entry into the card reading apparatus.

Accordingly, since the irregularly shaped, or V-notch card edge 22 provides the above-mentioned advantages, and does so even though the edge 22 is perpendicular to the front and back card surfaces, the card 14 can be simply and inexpensively punched or stamped from sheet or strip stock, such as a sheet or strip of polypropylene, rubber modified styrene, or vinyl.

Referring to FIG. 1, the information bearing holes 16 are punched or drilled into the card in accordance with a predetermined code, such as the code disclosed in the above-mentioned Andregg et al. patent. The hole punching or drilling can be accomplished by simple hand-held punches or drills. Since the information bearing holes are punched or drilled into the card selectively on the basis of the predetermined code, there is no necessity for prescoring the card as in the case of the above-mentioned prior art cards provided with the above-mentioned "knock-outs," and since there is no card prescoring, the information bearing holes will appear only where required for card coding and thus the information bearing holes can be larger than with prescoring without undue weakening of the card mechanically, and since the information holes can be larger, there is no need for the sides of the information bearing holes to be beveled. Accordingly, the information bearing holes 16 of the card 14, since they need not be beveled, present no requirement for molding the card. Thus, the manner of formation of the information bearing holes contributes to the possibility of stamping or punching the card from sheet or strip stock.

As mentioned generally above, it is essential that the card sensing members 10 be properly oriented with respect to the rows of information or intelligence bearing holes 16, especially when the card sensing members become worn or dirty through use. More specifically, the row of sensing members 10 and their associated datum bar 28, must have the proper physical attitude or orientation with respect to the rows of coded holes to ensure proper entry of the sensing members 10 into the codes holes 16 upon the presentation of the rows of coded holes to the sensing members.

To facilitate the entry of the sensing members 10 into the coded holes 16, the sensing members and associated datum bar 28 are sized and dimensioned to be partially rotatable between the confining walls 32 and 34. Thus, upon insertion of the data input card 14 into the card reading apparatus, the downward movement of the card rotates the sensing members and datum bar slightly downwardly or counter-clockwise, as shown in FIG. 2. However, for proper reading of the coded holes 16, the sensing members 10 and datum bar 28 must be rotated slightly upwardly or clockwise as shown in FIG. 2. If this is not accomplished, the sensing members may not become properly oriented until they have gone through the process of reading the first character (first row of coded holes 16), and hence, the first character can be lost.

To ensure that the sensing members are properly oriented prior to the sensing of the first character, the data input card 14 of the present invention is provided with non-information bearing holes 36; which holes are referred to as "nonsense" holes. The holes 36 are non-information bearing holes, or "nonsense" holes, since they are both in the same row or line and are both formed in the same group, i.e., Group II, and, in accordance with the information hole coding scheme disclosed in the above-mentioned Andregg et al. patent, to provide an information or intelligence bearing row of coded holes, no more than one hole is ever formed in a single group, in one row or on one line. Thus, the card sensing members will sense the "nonsense" holes, two of the sensing members will enter the "nonsense" holes, and the upward movement of the card will move the two sensing members upwardly and such two sensing members will rotate the associated datum bar slightly clockwise, thereby moving all of the sensing members upwardly, as shown in FIG. 3, into the position of proper orientation with respect to the coded holes 16; it being understood that all of the individual sensing members 10 extend through the single datum bar 28.

Although the preferred embodiment of the present invention is a data input card provided with an irregularly shaped edge in the form of a V-notch ("fishtail" shaped), it will be understood that such irregularly shaped edge could assume other configurations, such as for example, by being scalloped. It will be manifest to those skilled in the art that many other modifications and variations can be made in the present invention without departing from the spirit and scope thereof.

What is claimed is:

1. A data input card adapted to be inserted into a card reading apparatus, which apparatus includes a plurality of individually biased sensing elements movable individually from a rest position into a sensing position, which card comprises:

a relatively flexible, generally rectangular shaped, planar structure made of a relatively smooth plastic;

an irregularly shaped edge formed on said structure, which edge is perpendicular with the top and bottom surfaces of said structure, and which edge is formed substantially in the shape of a V;

said edge, upon insertion of the card into the card reading apparatus, engageable sequentially with said sensing elements and operable to move said sensing elements sequentially from said rest position into said sensing position; and a plurality of non-information or non-intelligence bearing holes for sensing by said sensing elements and operable in cooperation with the movement of said card by said card reading apparatus, to move said sensing elements into a predetermined orientation with respect to said card.

2. A data input card adapted to be inserted into a card reading apparatus, which apparatus includes a plurality of individually biased sensing elements movable individually from a rest position into a sensing position, which card comprises:

a relatively flexible, generally rectangularly shaped, planar structure made of a relatively smooth plastic;

an irregularly shaped edge formed on said structure, which edge is perpendicular with the top and bottom surfaces of said structure, and which edge is formed substantially in the shape of a V;

said edge, upon insertion of the card into the card reading apparatus, engageable sequentially with said sensing elements and operable to move said sensing elements sequentially from said rest position into said sensing position;

a plurality of non-information or non-intelligence bearing holes for sensing by said sensing elements and operable in cooperation with the movement of said card by said card reading apparatus, to move said sensing elements into a pre-determined orientation with respect to said card; and an imperforate, smooth field portion on which may be placed in written form the information to be recorded in the card in the form of coded holes.

3. A data input card adapted to be inserted into a card reading apparatus, which apparatus includes a plurality of individually biased sensing elements movable individually from a rest position into a sensing position, which card comprises:

a relatively flexible, generally rectangularly shaped, planar structure made of a relatively smooth plastic;

an irregularly shaped edge formed on said structure, which edge is perpendicular with the top and bottom surfaces of said structure, and which edge is formed substantially in the shape of a V;

said edge, upon insertion of the card into the card reading apparatus, engageable sequentially with said sensing elements and operable to move said sensing elements sequentially from said rest position into said sensing position;

a plurality of non-information or non-intelligence bearing holes for sensing by said sensing elements and operable in cooperation with the movement of said card by said card reading apparatus, to move said sensing elements into predetermined orientation with respect to said card;

an imperforate, smooth field portion on which may be placed in written form the information to be recorded in the card in the form of coded holes; and a perforated field portion including a plurality of rows of information or intelligence bearing coded holes formed in said card in accordance with a predetermined code; said rows of coded holes for sensing by said plurality of sensing elements.

References Cited

UNITED STATES PATENTS

| | | | |
|---|---|---|---|
| 1,073,248 | 9/1913 | Kouba | 129—16.5 |
| 2,817,824 | 12/1957 | Albright. | |
| 2,967,916 | 1/1961 | Williams. | |
| 3,114,036 | 12/1963 | Andregg | 129—16.1 XR |
| 3,139,519 | 6/1964 | Reinschmidt | 235—61.111 |
| 3,185,949 | 5/1965 | Jordan | 235—61.11 |
| 3,189,692 | 6/1965 | Andregg et al. | |

MAYNARD R. WILBUR, Primary Examiner

S. SHEINBEIN, Assistant Examiner

U.S. Cl. X.R.

179—6.3, 90; 235—61.11